United States Patent Office 3,507,901
Patented Apr. 21, 1970

3,507,901
METHOD FOR PREPARING METHYLENE BIS (THIOCYANATE)
Joseph Matt, Chicago, Eugene W. Hunter, La Grange, and Louis A. Goretta, Naperville, Ill., assignors to Nalco Chemical Company, Chicago, Ill., a corporation of Delaware
No Drawing. Filed Dec. 23, 1966, Ser. No. 604,122
Int. Cl. C07c 161/02; A01n 9/18
U.S. Cl. 260—454     8 Claims

ABSTRACT OF THE DISCLOSURE

The present invention is directed to an improved method for making the industrial biocide, methylene bis (thiocyanate). The invention also is concerend with conducting the reaction between a dihalo methane and an alkali or alkaline earth metal thiocyanate using water as a reaction medium. No organic solvents are required. The invention prescribes reacting the metal thiocyanate and dihalomethane under specific conditions of temperature, e.g., not in excess of 85° C., whereby an improved yield of a product is afforded which is characterized as being relatively free of polymerization or resinification products.

---

In a preferred embodiment of the invention, specific dihalomethanes are employed which contain at least one bromine or iodine atom, with bromine being preferred. In a most preferred embodiment, the invention shows that extremely pure methylene bis (thiocyanate) is formed when methylene bromide is reacted with at least two moles of an aqueous solution of an alkali metal thiocyanate for a relatively short period of time at a temperature range between 78°–82° C.

Methylene bis (thiocyanate) has proven itself to be an outstanding industrial chemical for use in the control of a variety of species of industrial microorganisms. When properly formulated, it has been successfully used to treat microbiological contamination occurring in such industrial systems as paper mills, cooling towers, and the like. It is extremely effective at doses not exceeding a few parts per million. Not only is it effective at low dosages, but is able to control a broad spectrum of microorganisms found in many industrial systems.

To the present, it has been customary to produce methylene bis (thiocyanate) by reacting a suitable dihalomethane such as methylene bromide with an alkali metal thiocyanate using as a solvent system an organic solvent such as dimethylformamide. The reaction has required long reaction conditions and has produced the desired product in poor yields. The finished product has required exhaustive alcohol purifications to produce a product of adequate purity for industrial uses. All the reactions conducted by past workers have produced a finished product which is contaminated with polymeric or resinous products of unknown composition. Because of the many difficulties experienced in producing methylene bis (thiocyanate) using conventional organic preparative techniques, this material has been extremely costly, thereby resulting in a somewhat limited usage of this compound in large scale industrial applications.

It becomes obvious that if a cheaper method were available to produce a satisfactory grade methylene bis (thiocyanate), its adaptation to microorganism control in industrial process systems would be substantially increased, thereby affording a larger segment of industry many benefits obtained by using this remarkable microbiocide. It therefore becomes an object of the invention to provide an improved, more economical method for producing methylene bis (thiocyanate).

Another object of the invention is to provide an improved method for producing methylene bis (thiocyanate) which affords good yields and, to a great extent, minimizes purification techniques heretofore required to produce a satisfactory product.

Other objects will appear hereinafter.

In accordance with the invention, it has been found that methylene bis (thiocyanate) may be readily synthesized by reacting a dihalomethane with at least two moles of an alkali metal or alkaline earth metal thiocyanate at a temperature below 85° C. for a relatively short period of time. An important feature of the invention resides in the fact that the reaction is conducted in an aqueous medium which is substantially free of organic solvents.

While any dihaloalkane may be used in preparing methylene bis (thiocyanate), it is preferred that the dihaloalkane contain at least one atom of either bromine or iodine, or both, thus, for example, preferred materials are methylene bromide, methylene iodide, bromochloromethane, bromoiodomethane, and iodochloromethane. Of these materials, the most preferred is methylene bromide, $CH_2Br_2$.

As will be shown later, when methylene bromide is used as one of the starting materials, it is possible to prepare by the techniques prescribed herein a finished methylene bis (thiocyanate) directly. Additional purification steps are not needed to produce a product which is satisfactory for use in the formulation of industrial microbiocidal compositions.

Alkali metal thiocyanates, the preferred metal thiocyanates, that may be used include the well known materials, sodium thiocyanate and potassium thiocyanate. While cesium and rubidium thiocyanates may be used, their high cost eliminates their feasibility. While ammonium thiocyanate may be considered for purposes of this invention as an alkali metal thiocyanate, it does not constitute a preferred material of the invention, since it should be relatively pure chemically to insure a satisfactory reaction. Similarly, due to economic considerations, the alkaline earth thiocyanates of e.g., magnesium, calcium, strontium, barium and radium, are not preferred, although operative in the processes described herein. Hereinafter the invention will be described with respect to the alkali metal thiocyanates for purposes of simplification.

As indicated, one of the chief points of novelty of this invention resides in conducting the reaction using as the reaction medium water, with no organic solvents being required. The water is conveniently furnished from the sodium or potassium thiocyanates, since these materials are most commonly manufactured and sold as concentrated aqueous solutions. It is, therefore, but a simple matter to use the water from the solutions of the sodium or potassium thiocyanates as the reaction medium for conducting the processes of the invention.

One of the most important concepts of the invention is that the reaction is conducted at a temperature not in excess of 85° C. At temperatures in excess of 85° C., excessive polymerization and discoloration of the finished methylene bis (thiocyanate) occurs. Also, when temperatures in excess of 85° C. are used, yields are dramatically reduced and subsequent purification steps are needed. When mixed dihalomethanes are used, such as, for example, chlorobromomethane, it is desirable to conduct the reaction at temperatures ranging between 65–82° C. When the preferred dihaloalkane, methylene bromide is used, a preferred reaction temperature is between 78–82° C.

As indicated, it has been an important part of the discovery of this invention that improved yields are obtained when the reaction is conducted for relatively short periods of time; in certain cases as little as four hours of heating produce high yields of the finished methylene bis (thiocyanate). As is the case in most organic reactions, however, the time is in indirect relation to the temperature, e.g., the lower the temperature, the longer the time. At lower temperatures, e.g., 65° C., heating times as long as 20 hours may be required to produce substantial yields of the methylene bis (thiocyanate), whereas, when preferred starting materials such as methylene bromide are used and the temperature is maintained at about 80° C., reaction times between 5–10 hours produce a high yield of the finished product. The reaction times, therefore, as presented herein and in the claims, are merely indicative for purposes of allowing one skilled in the art to practice the invention, but must be given value and weight in relationship to the conditions of the reaction, the starting materials, and the temperature of the reaction.

The equation used to represent the reaction formed by the practices of the invention is simply expressed as follows:

$$1CH_2X_2 + 2MSCN \rightarrow CH_2(SCN)_2 + 2MX$$

From this equation, it is obvious that at least two moles of the alkali metal thiocyanate are required to react with one mole of the dihalomethane to produce the finished methylene bis (thiocyanate). Experimentation has shown that it is desirable to use a slight molar excess of the alkali metal thiocyanate to insure high yields of the finished product. Here again, it has been discovered that the excess is dependent upon the particular dihalomethane used. In the case of the mixed dihalomethanes, it is oftentimes desirable to use as much as three moles of the alkali metal thiocyanate, whereas, in the case of methylene bromide 2.5–2.8 moles have given admirable results. It is also desirable to use the minimum molar excess to insure good yields without using any more, since the excess material is contained in the finished aqueous layer produced after the reaction is concluded and becomes an unwanted by-product.

While the alkali metal thiocyanate could be recovered and reused, it is undesirable, since it is beneficial from a standpoint of commercial optimization to recover the alkali metal halides produced by the reaction. The alkali metal salt recovery, in the case wherein methylene bromide is used as a starting material, entails the recovery of an alkali metal bromide which may be purified and recovered and sold as an alkali metal bromide salt. From this, it is obvious that large excesses of the alkali metal thiocyanate should not be used, since it is a contaminant in the finished salt recovery step and is therefore needlessly wasted.

To illustrate a preferred preparation of methylene bis (thiocyanate) in accordance with the practice of the invention Example I is presented below:

EXAMPLE I

A mixture of 225 grams of 52% aqueous technical sodium thiocyanate, 9 grams of reagent grade sodium thiocyanate, and 104.4 grams of methylene bromide were heated for six hours at 80° C. with agitation in an all glass system.

The reaction mixture was treated with 20 grams of water to dissolve the precipitated sodium bromide salts formed during the reaction. Cooling of the reaction mixture with agitation resulted in the precipitation of methylene bis(thiocyanate). The crystals were collected, water washed, and air dried. The final crystals were analyzed and were shown to have a purity by infrared analysis, 98.5%. The yield of methylene bis(thiocyanate was 93%.

Example II presented below illustrates another typical preparation using the practices of the invention, only in this case the starting dihaloalkane is chlorobromomethane. This example also points out that when the non-preferred dihaloalkanes are used, a subsequent purification step is required in order to produce a finished product having the necessary degree of purity.

EXAMPLE II

In a 22 l. flask 12,980 gms. of 57% aqueous sodium thiocyanate, 1969 gms. technical grade sodium thiocyanate, and 4290 gms. chlorobromomethane were heated for six hours at 78–82° C. The temperature must not rise above 82° C. in order to inhibit polymer by-product formation. Water (1200 ml.) was added to dissolve precipitated salts, and the reaction mixture was cooled with agitation. The crystals of methylene bis(thiocyanate) were filtered, washed with 4 gallons of water, and air-dried.

Yield=3282 gms.
Percent yield=76.5%
M.P.=104.7° C.
Purity=95.5% (infrared analysis)

Purification: Crude methylene bis(thiocyanate) from the chlorobromomethane preparation (100 gms.), isopropanol (120 g.), and water (466 g.) were charged into a steam, jacketed 1 l. flask equipped with a bottom stopcock. The methylene bis(thiocyanate) dissolves at a temperature of 80° C., leaving a red liquid polymeric impurity which settles to the bottom of the reaction vessel when agitation is stopped. The impurity was siphoned off through the stopcock and the yellow solution poured into a beaker to crystallize. Light bellow needles of methylene bis(thiocyanate) were obtained. These were filtered, water-washed, and air-dried. The purity of this product was 97.5%.

It can be seen from the above example that by using the expediency of washing the finished product with a mixture of hot water and isopropanol it is possible to produce a high purity methylene bis (thiocyanate). When it is desired to purify the product by this method, it is desirable to use a ratio of alcohol to water within the range of 10:1 to 1:10, with a preferred range being within the range of 4:1 to 1:4 and with the most preferred range being 1:4. While isopropanol is used in the example, it will be understood that other water miscible alcohols such as methanol, ethanol and normal propanol, may be used. In the case of methanol and ethanol, lower temperatures must be employed, since care must be used to avoid boiling off the alcoholic portion of the purification liquid. While the above described alcohols represent a preferred group of water miscible solvents, water soluble solvents such as acetone, methyl-ethyl ketone, dimethyl formamide and dimethylsulfoxide also may be used.

To illustrate the effect of variables in conducting the reaction, Tables 1–4 are presented below. Table 1 shows the effect of the concentration of the metal thiocyanate; Table 2 shows the effect of the concentration of the water used in conducting the reaction; whereas, Table 3 shows the effect of the ratio of the alkali metal thiocyanate to the dihaloalkane. Table 4 shows the effect of time and temperature in relationship to product produced in yield.

TABLE 1.—EFFECT OF METAL THIOCYANATE

| Thiocyanate (moles) | Organic (moles) | Conditions | Yield (percent) |
| --- | --- | --- | --- |
| NaSCN (1.56) | BMB [1] | Heated 6 hours at 80° C. | 93 |
| NH₄SCN (1.4) | BMB (0.6) | | [3] |
| KSCN-Reagent (2.4) | MCB [2] (0.6) | | 76 |
| NaSCN Reagent (2.4) | MCB (0.6) | | 75 |
| NaSCN Tech (2.4) | MCB (0.6) | | 75 |
| NaSCN Commercial (2.4) | MCB (0.6) | | 75 |
| NH₄SCN (2.4) | MCB (0.6) | | [3] |

[1] Methylene bromide.
[2] Chlorobromomethane.
[3] Only extensive polymerization occurred under these conditions.

TABLE 2.—EFFECT OF WATER CONCENTRATION

| H₂O Concentration (percent) | Organic | Conditions | Yield (percent) |
|---|---|---|---|
| 46 | BMB [1] | 2.6 SCN/BMB heated 6 hours at 80° C. | 93 |
| 38 | BMB |  | 93 |
| 32 | BMB |  | 93 |
| 56 | MCB [2] | 3.5 SCN/MCB heated 6 hours at 85° C. | 65 |
| 52 | MCB |  | 65 |
| 46 | MCB |  | 65 |
| 43 | MCB |  | 64 |
| 40 | MCB |  | 66 |

[1] Methylene bromide.
[2] Chlorobromomethane.

TABLE 3.—EFFECT OF THIOCYANATE/ORGANIC RATIO

| SCN/Organic (mole ratio) | Organic | Conditions | Yield (percent) |
|---|---|---|---|
| 2.2 | BMB [1] | 54% soln. of NaSCN in H²O 6 hours at 80° C. | 79 |
| 2.5 | BMB |  | 88 |
| 2.6 | BMB |  | 93 |
| 3.0 | BMB |  | 93 |
| 4.2 | BMB |  | 93 |
| 4.8 | MCB [2] | 57% soln. of NaSCN in H²O 6 hours at 85° C. | 73 |
| 3.6 | MCB |  | 72 |
| 3.0 | MCB |  | 65 |

[1] Methylene bromide.
[2] Chlorobromomethane.

TABLE 4.—EFFECT OF TIME AND TEMPERATURE

| Time (hrs.) | Temp. (° C.) | Organic | Conditions | Yield (percent) |
|---|---|---|---|---|
| 1 | 80 | BMB [1] | 2.6 SCN/BMB using 54% aqueous NaSCN. | 0 |
| 2 | 80 |  |  | 18 |
| 3 | 80 |  |  | 53 |
| 4 | 80 |  |  | 73 |
| 5 | 80 |  |  | 89 |
| 6 | 80 |  |  | 91 |
| 1 | 70 | BMB | 2.6 SCN/BMB using 60% NaSCN in H₂O. | 0 |
| 4 | 70 |  |  | 0 |
| 5 | 70 |  |  | 24 |
| 7 | 70 |  |  | 45 |
| 8 | 70 |  |  | 53 |
| 9 | 70 |  |  | 64 |
| 12 | 70 |  |  | 66 |
| 24 | 70 |  |  | 74 |
| 6 | 85 | BMB | 2.6 SCN/BMB | 92 |
| 0–10 | 60 | MCB [2] | 3.5 SCN/MCB | 0 |
| 13 | 67 | MCB | 3.5 SCN/MCB using 62% aqueous NaSCN. | 46 |
| 14 | 67 |  |  | 60 |
| 15 | 67 |  |  | 65 |
| 16 | 67 |  |  | 77 |
| 17–20 | 67 |  |  | 76 |
| 0–5 | 70 | MCB | 3.5 SCN/MCB using 62% aqueous NaSCN. | 0 |
| 6 | 70 |  |  | 3 |
| 7 | 70 |  |  | 11 |
| 8 | 70 |  |  | 27 |
| 9 | 70 |  |  | 49 |
| 10 | 70 |  |  | 65 |
| 13 | 70 |  |  | 77 |
| 0–5 | 75 | MCB | 3.5 SCN/MCB using 62% aqueous NaSCN. | 0 |
| 6 | 75 |  |  | 32 |
| 7 | 75 |  |  | 52 |
| 8 | 75 |  |  | 67 |
| 9 | 75 |  |  | 73 |
| 10 | 75 |  |  | 76 |
| 0–4 | 80 | MCB | 3.5 SCN/MCB using 62% NaSCN (aqueous). | 0 |
| 5 | 80 |  |  | 55 |
| 6 | 80 |  |  | 70 |
| 7–9 | 80 |  |  | [3] 74 |
| 4 | 85 | MCB | 2.4 moles KSCN, 0.6 moles MCB using 54% aqueous KSCN. | 54.5 |
| 6 | 85 |  |  | 73 |
| 8 | 85 |  |  | [3] 52 |
| 10 | 85 |  |  | [3] 54 |
| 6 | 90 | MCB |  | ([4]) |

[1] Methylene bromide.
[2] Chlorobromomethane.
[3] Extensive polymerization begins to occur.
[4] Only extensive polymerization occurred under these conditions.

As previously indicated, after the reaction mixture is cooled, the methylene bis (thiocyanate) tends to completely precipitate from the reaction medium. Along with this precipitation, a certain amount of sodium halide salts also tends to precipitate and become admixed with the finished product. In certain cases, it is good manufacturing practice of the invention to cold water wash the finished crystals to remove any residual alkali metal salts contained therein. This may be done by simple vacuum filtration or centrifuging techniques. The salts thus removed are combined with the residual mother liquor and concentrated to produce valuable alkali metal halide salts which may then be sold as a chemical of industry.

The invention provides not only simplified, novel reaction techniques and conditions for producing methylene bis (thiocyanate), but also has the additional advantage of allowing the material to be economically produced, using inexpensive materials with a minimum of heat and allowing reaction to be completed in a relatively short period of time. As indicated from some of the examples, excessive heating tends to diminish the yield. By avoiding the use of expensive organic solvents, it is possible to simply extract the finished product from the reaction medium and use it almost as produced for purposes of formulating microbiocidal formulas.

Typical industrial usages of methylene bis (thiocyanate) as an industrial microbiocide are set forth in the teaching of U.S. 3,252,855.

Having thus described our invention in all its useful and novel aspects, it is claimed as follows:

1. A method of preparing methylene bis (thiocyanate) which comprises the steps of reacting one mole of a dihalonmethane selected from the group consisting of chloro, bromo and iodo dihalomethanes, with the proviso that said dihalomethane contain at least one atom of either bromine or iodine, with a slight molar excess of over 2 moles but not greater than 3 moles of a metal thiocyanate from the group consisting of alkaline earth and alkali metal thiocyanates at a temperature from 65° to 85° C. for a period of time sufficient to produce methylene bis (thiocyanate) and then recovering the methylene bis (thiocyanate), said reaction being conducted in water.

2. The method of claim 1 where the dihalomethane is methylene bromide.

3. The method of claim 1 where the dihalomethane is chlorobromomethane.

4. The method of claim 1 where the molar ratio of alkali metal thiocyanate to dihalomethane is 2.5:1.

5. A method of preparing methylene bis (thiocyanate) which comprises the steps of reacting chlorobromomethane with a slight molar excess of over 2 moles but not greater than 3.0 moles of an alkali metal thiocyanate dissolved in water at a temperature between 65° to 85° C. for a period of time sufficient to produce substantial quantities of methylene bis (thiocyanate), removing the methylene bis (thiocyanate) from the reaction medium in the form of impure crystals and then purifying said crystals by treating them with a warm solution of a water-miscible organic solvent and water, with the ratio of organic solvent to water being within the range of 10:1–1:10 to dissolve relatively pure methylene bis (thiocyanate) from its entrained impurities and then crystallizing the purified methylene bis (thiocyanate) from the water-miscible organic solvent solution to produce a relatively pure methylene bis (thiocyanate).

6. The method of claim 5 where the water-miscible organic solvent is isopropanol and is used in an isopropanol to water ratio of 1:4.

7. A method of producing methylene bis (thiocyanate) which comprises the steps of reacting methylene bromide with at least 2.2 moles but not greater than 3 moles of an alkali metal thiocyanate dissolved in water at a temperature between 78° to 82° C. for at least 4 hours to produce a substantial quantity of methylene bis (thiocyanate) and then removing by crystallization the thus produced methylene bis (thiocyanate).

8. A method of producing methylene bis (thiocyanate) which comprises the steps of reacting methylene bromide with at least 2.5 moles but not greater than 3 moles of an alkali metal thiocyanate dissolved in water at a temperature between 78° to 82° C. for a period of time between 5–10 hours to produce a substantial quantity of methylene bis (thiocyanate) and then recovering by crystallization the thus produced methylene bis (thiocyanate).

References Cited

UNITED STATES PATENTS

| | | | |
|---|---|---|---|
| 2,372,809 | 4/1945 | Bruson | 260—454 |
| 2,855,339 | 10/1958 | Klopping | 260—454 XR |
| 2,939,875 | 6/1960 | Floria | 260—454 |
| 2,965,537 | 12/1960 | Rosen | 260—454 XR |
| 3,433,737 | 3/1969 | Wehner | 260—454 XR |

FOREIGN PATENTS 525,136   8/1949   Great Britain.

CHARLES B. PARKER, Primary Examiner

D. H. TORRENCE, Assistant Examiner

U.S. Cl. X.R.

424—302

PO-1050
(5/69)

UNITED STATES PATENT OFFICE
CERTIFICATE OF CORRECTION

Patent No. 3,507,901              Dated April 21, 1970

Inventor(s) Joseph Matt et al

It is certified that error appears in the above-identified patent and that said Letters Patent are hereby corrected as shown below:

Column 1, line 16, "concerend" should read -- concerned --.

Column 4, line 24, "steam, jacketed" should read -- steam jacketed --; line 30, "bellow" should read -- yellow --; in the table, "BMB$^1$" should read -- BMB$^1$ (0.6) --.

Column 6, line 25, "dihalonmethane" should read --dihalomethane --.

SIGNED AND
SEALED
SEP 15 1970

(SEAL)
Attest:

Edward M. Fletcher, Jr.
Attesting Officer

WILLIAM E. SCHUYLER, JR.
Commissioner of Patents